June 14, 1955  R. H. PRICE  2,710,629
FLEXIBLE DIAPHRAGMS

Filed Jan. 26, 1951  2 Sheets-Sheet 1

INVENTOR
Richard Hector Price
BY A. F. Odell
ATTORNEY

United States Patent Office 2,710,629
Patented June 14, 1955

2,710,629

FLEXIBLE DIAPHRAGMS

Richard Hector Price, Cwmbran, Newport, England, assignor to Saunders Valve Company Limited, Newport, England, a British company Application January 26, 1951, Serial No. 207,884

Claims priority, application Great Britain February 3, 1950

18 Claims. (Cl. 137—793)

This invention relates to flexible diaphragms exposed to fluids, as used for instance in diaphragm valves. At present they are usually made of natural or synthetic rubber or similar plastic elastomer reinforced with embedded fabric and typical examples are shown in patent specifications of British Patent No. 434,665, dated March 6, 1934, and U. S. appl. of Price and Kaye, Ser. No. 108,676, filed August 5, 1949

Natural or synthetic rubber and similar elastomers are comparatively cheap and also have a reasonable life when exposed to a variety of common fluids even at somewhat elevated temperatures, but they are not suitable for a number of reactive fluids which are by no means uncommon. There has recently become available polymerised tetrafluoroethylene (referred to hereinafter as PTFE which term is to be understood as including any usual admixture) which can be moulded or machined to shape and when not too thick is flexible; this substance is extremely inert chemically so that it is resistant to highly reactive fluids and also has a high degree of thermal stability. Unfortunately it is extremely expensive and the cost of making a reinforced diaphragm using this material in place of rubber or the like is prohibitive. Also owing to its chemical and physical nature a thin facing cannot be secured by adhesive to a thicker diaphragm of cheaper material and a diaphragm with a mere juxtaposed facing of this material is of no use where the diaphragm has to respond to a pull as well as a push.

According to the present invention a facing for a flexible diaphragm comprises a layer of PTFE having on the back thereof integral projections which can be mechanically interlocked with a backing diaphragm of flexible material.

The invention also includes within its scope a flexible diaphragm comprising a flexible backing diaphragm, a flexible facing of PTFE, and integral projections on the back of the facing which are mechanically interlocked with the backing diaphragm.

In cases in which the diaphragm is provided with a boss and stud having its head embedded therein (as for example in Patent No. 1,855,991 or British appln. No. 8,753/50, filed April 5, 1952) according to a further development of the present invention, the facing has integral projections mechanically interlocked with both the backing and with the stud itself. Those which interlock with the stud necessarily interlock with the backing diaphragm and there may be others which only interlock with the backing diaphragm and not with the stud.

A preferred form of facing comprises a central boss of small thickness on a flexible layer of PTFE, and flexible integral lugs on the boss extending (before interlocking) substantially parallel with the facing. The invention includes a method of making such a diaphragm, according to which a deep groove is cut for example on a lathe, near the end of a solid bar of PTFE, thereby defining a flexible layer and the central boss, thus the bar is cut off at a sufficient distance from the end to leave a second flexible layer integral with the boss and then one of the layers is then trimmed and notched to convert it into the lugs.

By way of example, some embodiments of the present invention will now be described with reference to the accompanying drawings, in which Figure 1 is a cross section of one form of diaphragm, Figure 2 is a section on the line II—II of Figure 3 of a second form of diaphragm, Figure 3 is a plan of Figure 2, Figure 4 is a cross section of a third form of diaphragm.

In all the illustrated examples it is assumed that the backing diaphragm 1 consists primarily of rubber by which term is included any material, such as synthetic rubber, which is worked and cured by substantially similar methods to natural rubber compositions; generally the diaphragm will be reinforced in the known way with embedded fabric or the like. The PTFE facing is shown in all cases at 4. The examples all show a form of diaphragm such as might be used in a Saunders diaphragm valve, a typical example of which is shown in patent specification No. 1,855,991. Such a diaphragm is usually moulded in the form appropriate to the fully open position of the valve, thus comprising a dished central part and a margin for clamping on the valve body, which margin may be flat or may be coned (see specification of the application of Kaye, Serial No. 620,768, filed October 6, 1945, now Patent No. 2,605,991). The invention is not limited to a dished diaphragm however; the diaphragm might be wholly flat, or on the other hand it might have the main part moulded of much deeper form as for example for use in a valve according to the specification of the application Price and Kaye, Ser. No. 108,676, filed August 5, 1949. Again in all the illustrated examples the backing diaphragm 1 is shown with an integral boss 2 but where this is not required it may be omitted. In the case of a diaphragm valve this boss usually serves for the anchorage of a headed stud by which the diaphragm can be pulled off its seating when the valve is opened and such a stud is shown in Figures 4, 9, 12, and 13.

Figure 1:

Referring now to Figure 1, the PTFE facing 4 on the backing diaphragm 1 has on its back a plurality, for instance in alignment, of integral lugs 5 which pass through slots moulded in the diaphragm 1 on opposite sides of its centre, there being held as by metal pins 6 passed through the lugs just clear of the back of the diaphragm.

Figure 2:
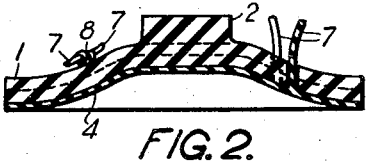
Figure 3:
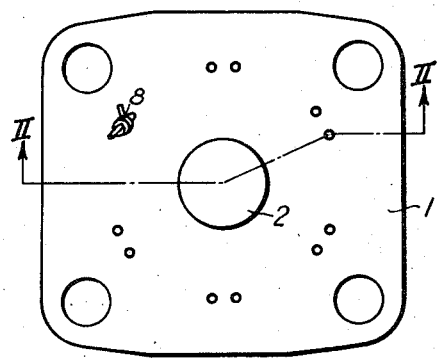

In Figure 2 the facing 4 has a series of integral laces 7, conveniently, as shown, in pairs, so that when passed through corresponding holes in the diaphragm 1 they can be tied together as at 8; such laces 7 can, as indicated in Figure 3, be arranged for instance in a circle around the centre of the diaphragm.

Figure 4:
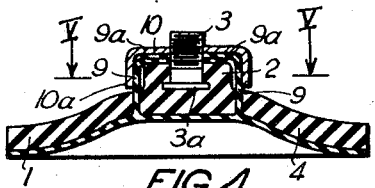
Figure 5:
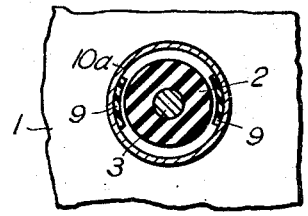
Figure 5 is a section on the line V—V of Figure 4.

In Figures 4 and 5 which show a stud 3 with a head 3a embedded in the boss 2 as in the aforesaid Patent No. 1,855,991 the facing 4 has lugs 9 of curved section which pass through curved slots in the diaphragm 1 just outside the base of the boss 2, their ends 9a being turned over on to the top of the boss and over the stud 3 which they are apertured to clear, the whole being reinforced by a metal cap 10 the centre of which has a hole which is passed over the stud and the downturned rim or wall 10a of which fits over the lugs 9 and boss 2.

Figure 6:
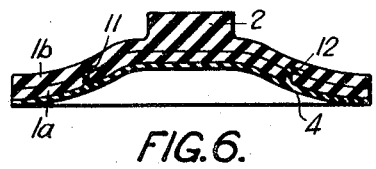
Figures 6 to 9 are sections of four further forms of diaphragm.

Since PTFE will withstand quite high temperatures, the facing may be applied to the diaphragm before it is cured. Thus as shown in Figure 6 laces 11 or lugs 12 can be passed through the bottom layer 1a of the diaphragm and the reinforcement and there tied or bent over, and be covered by the top layer 1b, all before curing and the assembly then be cured.

Figure 7:
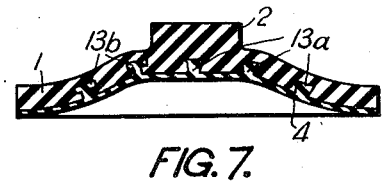
Figure 8:
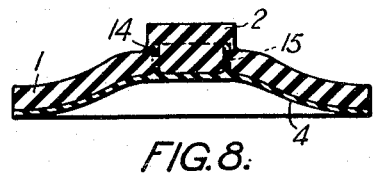

Again, as shown in Figure 7, the facing 4 may have integral separate lugs 13a of dovetail section or 13b of T-section which are embedded in the diaphragm before the latter is cured, or as shown in Figure 8 it may have an integral lug 14 of continuous circular or other form with holes 15 in it, which is similarly embedded before curing, the rubber penetrating and uniting through the holes.

Figure 9:
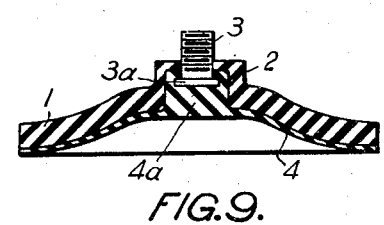

In another form shown in Figure 9 the head 3a of the stud 3 is embedded in a boss 4a formed integrally on the back of the facing 4, this boss extending into the boss 2 formed in the diaphragm 1.

It will be understood that any of the various forms of integral lug above described can be used in conjunction. Where projections interlock with the stud they also necessarily interlock with the backing diaphragm, but in addition others may be provided which do not interlock with the stud but only with the diaphragm, and the former projections may alternate with the latter.

Figure 10:
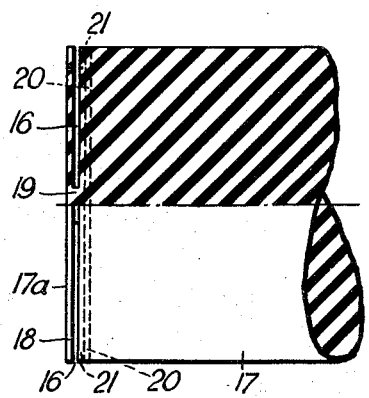
Figure 10 illustrates the making of another form of facing with parts shown in cross section.
Figure 11:
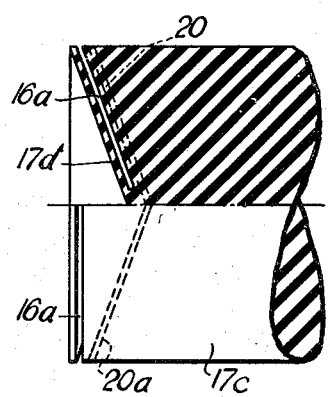
Figure 11 illustrates a similar method to Figure 10 but resulting in a somewhat modified form of facing.

All the above described forms of facing with their integral projections could be made by machining solid PTFE but this would involve converting an undue proportion of the material into cuttings and moulding would be a preferable method. Figures 10 and 11 illustrate methods of producing a facing by machining from the bar which does not involve an excessive quantity of cuttings and which results in a very satisfactory form of facing with integral projections. It is to be understood that this form could if desired be produced by moulding.

As shown in Figure 10, first a groove 16 is machined in the bar 17. This groove is located sufficiently close to the end 17a to leave a layer 18 of the desired thickness and is carried deep enough to leave a central core 19 to form a boss of the desired diameter. The bar is then cut off at 20 to leave a layer 21 of the desired thickness, thus forming a reel-shaped body. The thickness of the layers 18 and 21 will usually be equal. One of them, say 18, forms the facing proper and the other 21 is cut, notched and trimmed to form lugs usually of smaller radial length than the first; additionally the lugs will be perforated. The facing layer 18 may also need to be trimmed to the required outline if the section of the bar is not of the required form.

In Figure 10, both layers 18 and 21 are flat. As mentioned above in some cases the backing diaphragm is usually moulded in a dished form, as in a form corresponding to the fully open position of a diaphragm valve. Figure 11 shows a modification in which a form corresponding to the fully open (or closed) position of a diaphragm valve can be approximated. In this case the bar 17c is first hollowed out at the end as at 17d, the groove 16a is machined substantially parallel to the end 17d and the cut 20a is also made substantially parallel to the groove 16a and end 17d. Any appropriate hollow capable of being machined may be employed and the shallow conical form shown is only an example. It will be noted that the cut 20a automatically hollows out the end of the bar for the next facing and that accordingly after the first hollowing this method occasions no extra waste of material. It will be understood that the same effect could be obtained by working the opposite way, i. e. first machining the bar end convex and directing the groove 16a and the cut 20a substantially parallel thereto.

Figure 12:
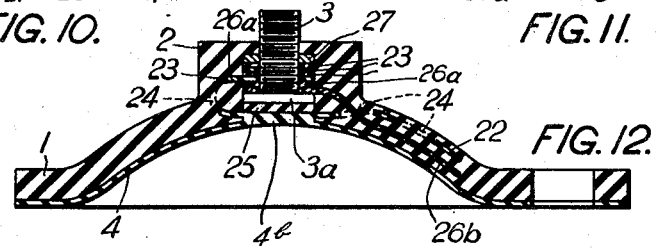
Figure 12 is a section on the line XII—XII indicated in Figure 13 of yet another form of diaphragm.
Figure 13:
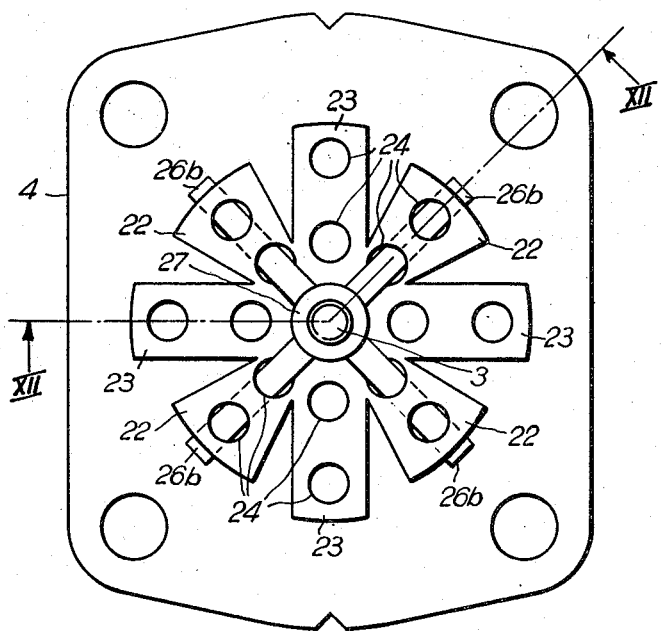
Figure 13 is a plan view of certain parts of Figure 12 at an early stage in assembly.

Figures 12 and 13 show a facing produced according to Figures 10 or 11, united to a backing diaphragm. As will be seen in Figure 13 the actual facing 4 has been produced by trimming one of the layers of the reel shaped body outline. The other layer has been V-notched to produce more or less sector shaped intermediate lugs 22 alternating with parallel sided lugs 23, and all reduced in radial length to bring them within the boundary of facing layer 4, also each lug has two holes 24 punched in it.

The stud 3 is placed in position on a disc 25 of rubber compound on the boss 4b of the facing and over its head 3a a piece of rubberised fabric having a central disc 26a and radial strip arms 26b; these arms are threaded down through the inner holes 24 of the intermediate lugs 22. A further disc of rubber compound is placed over the fabric disc, the four parallel sided lugs 23 are folded over, their outer holes threaded over the stud, see Figure 12, and a metal washer 27 is put on the stud. The bore of the washer may be screwed on the stud so that it remains firmly in place. The ordinary reinforced diaphragm is then built up as described in British patent specification No. 434,665, dated March 6, 1934, or application No. 8,573/50, filed April 5, 1950, care being taken that the intermediate lugs 22 of the facing and the fabric strip arms 26b are embedded and that the rubber composition fills all the holes 24. The facing disc proper is if necessary trimmed to outline at a convenient stage and the whole cured or vulcanized in a mould.

I claim:

1. A facing for a flexible diaphragm for exposure to fluids comprising an imperforate flexible layer of polytetrafluoroethylene, a central boss of small thickness on the one side of and integral with said layer, and flexible integral lugs on said boss extending substantially parallel to said layer but of smaller radial length, said lugs being apertured.

2. A method of making a facing for a flexible diaphragm for exposure to fluids which includes the steps of cutting a deep narrow groove near the end of a solid bar of polytetrafluoroethylene, thereby to define a flexible layer and a central boss, then cutting off the bar a sufficient distance from the end to leave a second flexible layer integral with said boss and then trimming, notching and aperturing one of said layers to convert it into apertured lugs.

3. A method according to claim 2 in which said bar is first shallowly hollowed out on its end, and said groove and the cutting of cutting off are effected substantially parallel with said hollowed end.

4. A flexible diaphragm comprising a flexible backing, an imperforate flexible facing of polytetrafluoroethylene having a back turned towards said backing, and integral projections on the back of the facing mechanically interlocked with the backing.

5. A flexible diaphragm comprising a flexible backing, an integral boss on the back of said backing, a headed stud having its head embedded in said boss and its shank projecting therefrom, a flexible facing of polytetrafluoroethylene on the front of said backing, and integral projections on the back of the facing mechanically interlocked with said stud shank.

6. A flexible diaphragm as set forth in claim 5 wherein said integral projections project right through said backing and are apertured so as to receive said stud shank therethrough, said diaphragm also comprising a metal cap engaged by a central aperture on said shank and engaging over said projections and said boss by its wall.

7. A flexible diaphragm as set forth in claim 5 also comprising integral projections on the back of the facing mechanically interlocked with said backing but not with said stud shank.

8. A flexible diaphragm as set forth in claim 7 in which said projections which interlock with said shank alternate with those which do not interlock with said shank.

9. A flexible diaphragm as set forth in claim 8 also comprising a fabric reinforcement embedded in said backing, said reinforcement including a central part threaded on said shank between the head thereof and said integral projections interlocked with said shank, and said reinforcement also including radial parts passing through holes in said integral projections not interlocked with said shank.

10. A flexible diaphragm as set forth in claim 9 also comprising a metal washer threadedly engaged on said shank over said integral projection threaded thereon, and embedded in said boss.

11. A flexible diaphragm as set forth in claim 4 in which the facing has integral projections which pass right through the backing and are secured beyond the back surface thereof.

12. A flexible diaphragm as set forth in claim 4 wherein said integral projections are of re-entrant form and are embedded in said backing.

13. A flexible diaphragm as set forth in claim 4 wherein said projections are apertured and are embedded in said backing the material of said backing being united through the apertures.

14. A diaphragm assembly comprising a facing for exposure to fluids adapted for use with a flexible diaphragm, said facing comprising a thin layer of polytetrafluoroethylene, flexible to withstand repeated deformation, a flexible diaphragm of resilient material relatively thicker than said facing, said layer having a peripheral portion adapted to be clamped between the body and bonnet of a valve and a central portion bounded by said peripheral portion and being completely imperforate and the said central portion having projecting means connected thereto and associated with said flexible diaphragm for mechanical interlocking of the layer with said diaphragm for coupled movement thereof.

15. A diaphragm assembly according to claim 14 wherein said projecting means is comprised of a boss on said layer and a stud with its head embedded in said boss and shank projecting through said diaphragm.

16. A diaphragm assembly comprising a thin facing for exposure to fluids and a flexible diaphragm, said facing comprising a layer, flexible enough to withstand repeated deformation within the limits required, of a plastic elastomer chemically substantially more inert than natural or synthetic rubber, said layer having a peripheral portion adapted to be clamped between the body and bonnet of a valve and a central portion bounded by said peripheral portion and being completely imperforate and said central portion having an unbroken surface on one face and integral projections on the other face which projections are mechanically interlocked with said flexible diaphragm.

17. An assembly as set forth in claim 16 wherein the facing is made of polytetrafluoroethylene.

18. A diaphragm assembly comprising a thin facing for exposure to fluids and a flexible diaphragm, said diaphragm being of the type having a central boss and a stud with a head embedded in the boss, said facing comprising a flexible layer of polytetrafluoroethylene having a peripheral portion adapted to be clamped between the body and bonnet of a valve and a central portion bounded by said peripheral portion and being completely imperforate and said central portion having on one surface thereof integral projections mechanically interlocked with said diaphragm.

References Cited in the file of this patent

UNITED STATES PATENTS

| Number | Name | Date |
|---|---|---|
| 1,258,475 | Segre | Mar. 5, 1918 |
| 1,599,054 | Lehr | Sept. 7, 1926 |
| 1,782,692 | Lawson | Nov. 25, 1930 |
| 1,855,991 | Saunders | Apr. 26, 1932 |
| 1,999,675 | White | Apr. 30, 1935 |
| 2,011,563 | Balfe | Aug. 20, 1935 |
| 2,309,260 | Strauss | Jan. 26, 1943 |
| 2,324,880 | Rogers | July 20, 1943 |
| 2,348,740 | Jennings | May 16, 1944 |
| 2,405,038 | Jennings | July 30, 1946 |
| 2,615,471 | McFarland | Oct. 28, 1952 |

OTHER REFERENCES

"Modern Plastics," November 1947, pp. 108 and 109.

"Modern Plastics" for October 1948, pages 168, 170, 172.

"Industrial and Engineering Chemistry" for October 1949, page 2133.

"Plastics and Resins" for May 1946, pages 14, 15, 16, 36.